(12) United States Patent
Swab

(10) Patent No.: US 10,596,881 B2
(45) Date of Patent: Mar. 24, 2020

(54) CHILLER FOR REFRIGERATION SYSTEM

(71) Applicant: CARRIER CORPORATION, Jupiter, FL (US)

(72) Inventor: Michael Swab, Acworth, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 159 days.

(21) Appl. No.: 15/549,886

(22) PCT Filed: Feb. 9, 2016

(86) PCT No.: PCT/US2016/017139
§ 371 (c)(1),
(2) Date: Aug. 9, 2017

(87) PCT Pub. No.: WO2016/130537
PCT Pub. Date: Aug. 18, 2016

(65) Prior Publication Data
US 2018/0037091 A1   Feb. 8, 2018

Related U.S. Application Data

(60) Provisional application No. 62/115,255, filed on Feb. 12, 2015.

(51) Int. Cl.
*B60H 1/32* (2006.01)
*F25B 13/00* (2006.01)
(Continued)

(52) U.S. Cl.
CPC ......... *B60H 1/3232* (2013.01); *B60H 1/3202* (2013.01); *F25B 13/00* (2013.01);
(Continued)

(58) Field of Classification Search
CPC ..... B60H 1/3232; B60H 1/3202; F25B 13/00; F25B 25/005; F25D 11/003; F25D 29/009;
(Continued)

(56) References Cited

U.S. PATENT DOCUMENTS 4,420,942 A   12/1983   Davis et al.
5,081,977 A   1/1992   Swenson
(Continued)

FOREIGN PATENT DOCUMENTS

CN   1431107 A   7/2003
CN   201646314 U   11/2010
(Continued)

OTHER PUBLICATIONS

JP-2006264568-A translation.*
(Continued)

*Primary Examiner* — Elizabeth J Martin
(74) *Attorney, Agent, or Firm* — Cantor Colburn LLP

(57) ABSTRACT

A refrigeration system for a selected space includes a regeneration heat exchanger containing a volume of heat transfer fluid and a cargo heat exchanger located at the selected space. The cargo heat exchanger is fluidly connected to the regeneration heat exchanger to circulate the volume of heat transfer fluid therethrough. The selected space is conditioned to a selected cargo temperature via thermal energy exchange between the heat transfer fluid and a flow of air at the selected space. A fuel line extends through the regeneration heat exchanger and toward an engine and directs a flow of fuel to the engine to power the engine. The flow of fuel is regenerated via thermal energy exchange with the heat transfer fluid at the regeneration heat exchanger. The heat transfer fluid reaches a selected heat transfer fluid temperature via thermal exchange with the flow of fuel.

17 Claims, 4 Drawing Sheets

(51) Int. Cl.
*F25B 25/00* (2006.01)
*F25D 11/00* (2006.01)
*F25D 29/00* (2006.01)
*F25B 27/00* (2006.01)
*F25B 27/02* (2006.01)
*F25B 49/00* (2006.01)

(52) U.S. Cl.
CPC .......... *F25B 25/005* (2013.01); *F25D 11/003* (2013.01); *F25D 29/003* (2013.01); *F25B 27/00* (2013.01); *F25B 27/02* (2013.01); *F25B 49/005* (2013.01); *F25B 2327/001* (2013.01)

(58) Field of Classification Search
CPC ... F25D 27/00; F25D 49/005; F25D 2337/001
See application file for complete search history.

(56) References Cited

U.S. PATENT DOCUMENTS

| | | |
|---|---|---|
| 5,373,700 A | 12/1994 | McIntosh |
| 5,560,212 A | 10/1996 | Hansen |
| 6,698,211 B2 | 3/2004 | Gustafson |
| 7,073,489 B2 | 7/2006 | Sexton et al. |
| 7,377,294 B2 | 5/2008 | Handa |
| 8,459,241 B2 | 6/2013 | Dixon et al. |
| 8,664,785 B2 | 3/2014 | Madison |
| 8,820,289 B2 | 9/2014 | Green |
| 9,186,958 B2 | 11/2015 | Lurken et al. |
| 2002/0124993 A1 | 9/2002 | Nakano |
| 2004/0026075 A1 | 2/2004 | Park et al. |
| 2005/0193747 A1 | 9/2005 | Kajimoto et al. |
| 2011/0225987 A1 | 9/2011 | Bowdish |
| 2013/0055728 A1 | 3/2013 | Lurken et al. |
| 2013/0068905 A1 | 3/2013 | Green |
| 2013/0180265 A1 | 7/2013 | Lee et al. |
| 2014/0013777 A1 | 1/2014 | Sun-Hae |
| 2014/0123916 A1 | 5/2014 | Coldren et al. |
| 2014/0157816 A1 | 6/2014 | Goh et al. |
| 2014/0223933 A1 | 8/2014 | Steele et al. |
| 2014/0250921 A1* | 9/2014 | Kang ............... B63H 21/38 62/49.1 |
| 2014/0260403 A1* | 9/2014 | Connell ............ B60H 1/3202 62/323.1 |
| 2016/0334146 A1 | 11/2016 | Swab |

FOREIGN PATENT DOCUMENTS

| | | |
|---|---|---|
| CN | 201872573 U | 6/2011 |
| CN | 102423997 A | 4/2012 |
| CN | 103574987 A | 2/2014 |
| CN | 103486878 B | 4/2015 |
| CN | 204730548 U | 10/2015 |
| CN | 105416009 A | 3/2016 |
| CN | 105716345 A | 6/2016 |
| CN | 205311285 U | 6/2016 |
| CN | 205523551 U | 8/2016 |
| CN | 206094713 U | 4/2017 |
| CN | 206287787 U | 6/2017 |
| CN | 107128150 A | 9/2017 |
| FR | 2773115 A1 | 7/1999 |
| GB | 2088475 A | 6/1982 |
| GB | 2383839 A | 7/2003 |
| JP | 2000028218 A | 1/2000 |
| JP | 2006264568 A | 10/2006 |
| JP | 5155471 B1 * | 6/2013 |
| WO | 2013043389 A1 | 3/2013 |
| WO | 2013134238 A1 | 9/2013 |
| WO | 2016055357 A1 | 4/2016 |
| WO | 2016123332 A1 | 8/2016 |
| WO | 2016130537 A1 | 8/2016 |

OTHER PUBLICATIONS

JP 5155471 B1 translation.*
Singapore Search Report Issued in SG Application No. 11201706011Q, dated Jun. 25, 2018, 4 Pages.
International Search Report and Written Opinion; International Application No. PCT/US2016/017139; International Filing Date: Feb. 9, 2016; dated May 13, 2016; 10 pages.
Chinese Office Action Issued in CN Application No. 201680009903.3, dated Jun. 21, 2019, 18 Pages.

* cited by examiner

CHILLER FOR REFRIGERATION SYSTEM

CROSS-REFERENCE TO RELATED APPLICATIONS

This application is a National Stage application of PCT/US2016/017139 filed on Feb. 9, 2016, which claims the benefit of U.S. Provisional Application No. 62/115,255, filed Feb. 12, 2015, which are incorporated herein by reference in their entirety.

BACKGROUND

The subject matter disclosed herein relates to refrigeration systems. More specifically, the subject matter disclosed herein relates to refrigeration of containers utilized to store and ship cargo.

A typical refrigerated cargo container or refrigerated truck trailer, such as those utilized to transport a cargo via sea, rail or road, is a container modified to include a refrigeration unit located at one end of the container. The refrigeration unit includes a compressor, condenser, expansion valve and evaporator serially connected by refrigerant lines in a closed refrigerant circuit in accord with known refrigerant vapor compression cycles. The evaporator is located in a compartment that requires cooling, such as a cargo compartment of a truck or trailer. The condenser and compressor are located outside of the compartment. Cargo compartment air is passed over the coils of the evaporator, vaporizing the refrigerant flowing through the evaporator coil, thus heat is absorbed from the air in the conditioned compartment to cool the conditioned compartment. The gaseous refrigerant is then flowed to the compressor for compression thereat. A power unit, including an engine, drives the compressor of the refrigeration unit, and is typically diesel powered, or in other applications natural gas powered. In many truck/trailer transport refrigeration systems, the compressor is driven by the engine shaft either through a belt drive or by a mechanical shaft-to-shaft link. In other systems, the engine drives a generator that generates electrical power, which in turn drives the compressor.

Many systems utilize natural gas fuels to power the engine. Natural gas fuels utilized include compressed natural gas (CNG), liquid natural gas (LNG) and propane. CNG, LNG, and propane, however, all require specialized storage and some operation on the fuel before its use at the engine. CNG is stored at ambient temperatures and a pressure of 3600 PSI. LNG is stored at ambient or close to ambient pressure but at a temperature of −273 F. Propane is stored at low pressure of around 300 PSI and ambient temperatures. Before these fuels can be used by the internal combustion engine they must be at ambient temperatures and ambient or close to ambient pressure. To accomplish this, CNG must be decompressed from 3600 PSI to about 10 PSI or less. This decompression process can cause temperature drop in the regulators and lines down to −60 F in some cases. For LNG the liquid must be heated from −273 F to ambient in order to regenerate the LNG into gaseous natural gas. This regeneration is typically achieved by use of an electric heater in the fuel system, or by utilizing waste heat from the engine to gasify the methane LNG. Propane is drawn as a liquid from the tank and heated to convert it into a gas.

BRIEF SUMMARY

In one embodiment, a refrigeration system for a selected space includes a regeneration heat exchanger containing a volume of heat transfer fluid and a cargo heat exchanger located at the selected space. The cargo heat exchanger is fluidly connected to the regeneration heat exchanger to circulate the volume of heat transfer fluid therethrough. The selected space is conditioned to a selected cargo temperature via thermal energy exchange between the heat transfer fluid and a flow of air at the selected space. A fuel line extends through the regeneration heat exchanger and toward an engine and directs a flow of fuel to the engine to power the engine. The flow of fuel is regenerated via thermal energy exchange with the heat transfer fluid at the regeneration heat exchanger. The heat transfer fluid reaches a selected heat transfer fluid temperature via thermal exchange with the flow of fuel.

Additionally or alternatively, in this or other embodiments the refrigeration system includes a refrigerant circuit having a refrigerant heat exchanger located in the regeneration heat exchanger and a compressor fluidly connected to the refrigerant heat exchanger to circulate a flow of refrigerant through the refrigerant heat exchanger. The engine is coupled to the compressor to drive the compressor. The heat transfer fluid reaches the selected heat transfer fluid temperature via thermal exchange with the flow of fuel and/or the flow of refrigerant.

Additionally or alternatively, in this or other embodiments the refrigerant circuit is configured to be switchable into a reversed operation to increase a temperature of the heat transfer fluid.

Additionally or alternatively, in this or other embodiments the flow of fuel is one of liquefied natural gas or compressed natural gas.

Additionally or alternatively, in this or other embodiments the heat transfer fluid is glycol.

Additionally or alternatively, in this or other embodiments one or more regulators are located at the fuel line in the regeneration heat exchanger.

Additionally or alternatively, in this or other embodiments thermal energy exchange between the heat transfer fluid and the one or more regulators at the regeneration heat exchanger prevents the temperature of the one or more regulators from falling below an operable regulator temperature.

Additionally or alternatively, in this or other embodiments one or more sensors are located at the regeneration heat exchanger to detect presence of the flow of fuel in the heat transfer fluid.

Additionally or alternatively, in this or other embodiments a fuel separator is operably connected to the regeneration heat exchanger to separate the flow of fuel from the heat transfer fluid.

Additionally or alternatively, in this or other embodiments a fuel line heat exchanger is located along the fuel line at the regeneration heat exchanger to aid in the thermal energy exchange between the flow of fuel and the heat transfer fluid.

Additionally or alternatively, in this or other embodiments the selected space is a refrigerated cargo container.

In another embodiment, a method of maintaining a selected space at a selected temperature includes directing a flow of fuel through a regeneration heat exchanger and toward an engine, the regeneration heat exchanger containing a volume of heat transfer fluid. The flow of fuel is regenerated via thermal energy exchange with the heat transfer fluid and the heat transfer fluid is thereby conditioned to a selected fluid temperature. At least a portion of the heat transfer fluid is directed to a cargo heat exchanger located at the selected space and thermal energy is exchanged between the heat transfer fluid and a flow of supply air at the cargo heat exchanger to condition the supply air to a selected air temperature. The heat transfer fluid is conveyed to the regeneration heat exchanger.

Additionally or alternatively, in this or other embodiments a compressor of a refrigerant circuit is powered via the engine. A flow of refrigerant is flowed through the compressor to a refrigerant heat exchanger positioned at the regeneration heat exchanger. Thermal energy is transferred between the flow of refrigerant and the heat transfer fluid at the regeneration heat exchanger thereby conditioning the heat transfer fluid to the selected fluid temperature via the thermal energy exchange with the flow of refrigerant and/or the flow of fuel.

Additionally or alternatively, in this or other embodiments operation of the refrigerant circuit is reversed to increase a temperature of the heat transfer fluid.

Additionally or alternatively, in this or other embodiments the flow of fuel is one of liquefied natural gas or compressed natural gas.

Additionally or alternatively, in this or other embodiments the flow of fuel is conveyed through one or more regulators positioned at the fuel line in the regeneration heat exchanger.

Additionally or alternatively, in this or other embodiments thermal energy is exchanged between the heat transfer fluid and the one or more regulators at the regeneration heat exchanger to prevent the temperature of the one or more regulators from falling below an operable regulator temperature.

Additionally or alternatively, in this or other embodiments the flow of fuel is directed through a fuel line heat exchanger disposed along the fuel line at the regeneration heat exchanger to aid in the thermal energy exchange between the flow of fuel and the heat transfer fluid.

Additionally or alternatively, in this or other embodiments the selected space is a refrigerated cargo container.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
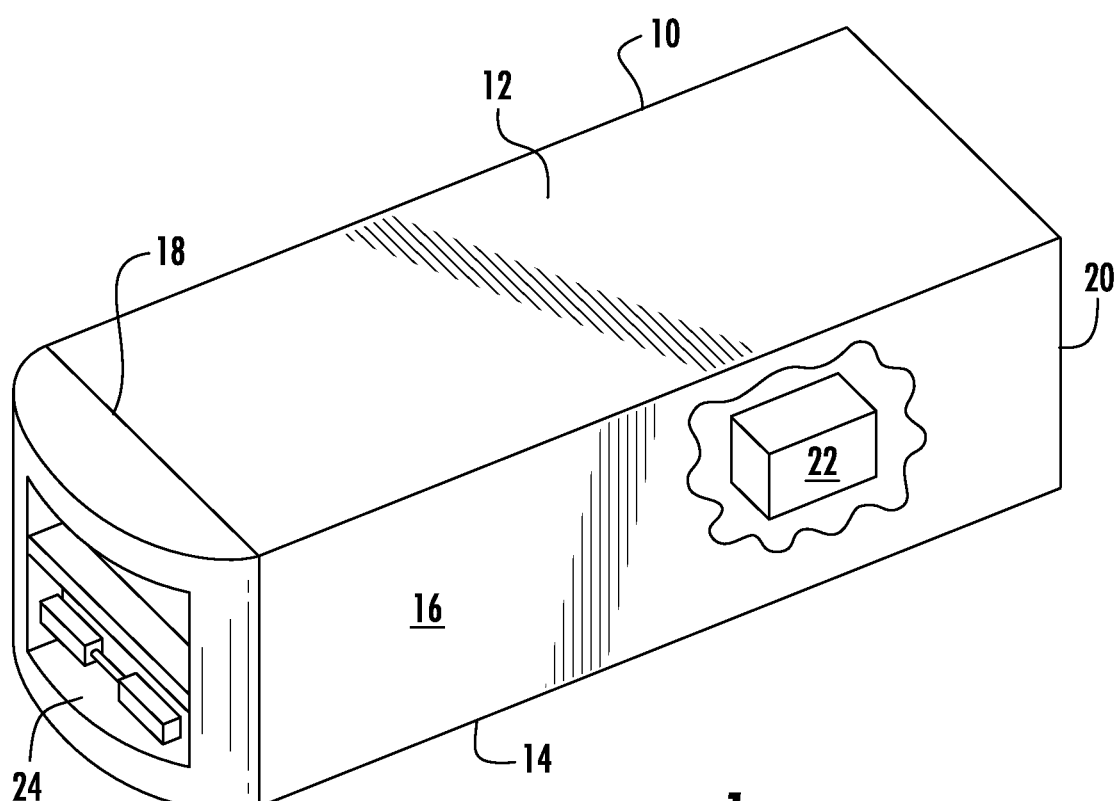
FIG. 1 is a schematic illustration of an embodiment of a refrigerated transportation cargo container.

The detailed description explains embodiments of the invention, together with advantages and features, by way of example with reference to the drawing.

DETAILED DESCRIPTION

Shown in FIG. 1 is an embodiment of a refrigerated cargo container 10. The cargo container 10 is formed into a generally rectangular construction, with a top wall 12, a directly opposed bottom wall 14, opposed side walls 16 and a front wall 18. The cargo container 10 further includes a door or doors (not shown) at a rear wall 20, opposite the front wall 18. The cargo container 10 is configured to maintain a cargo 22 located inside the cargo container 10 at a selected temperature through the use of a refrigeration unit 24 located at the container 10. The cargo container 10 is mobile and is utilized to transport the cargo 22 via, for example, a truck, a train or a ship. The refrigeration unit 24 is located at, for example, the front wall 18, but in other embodiments may be positioned at other locations.

Figure 2:
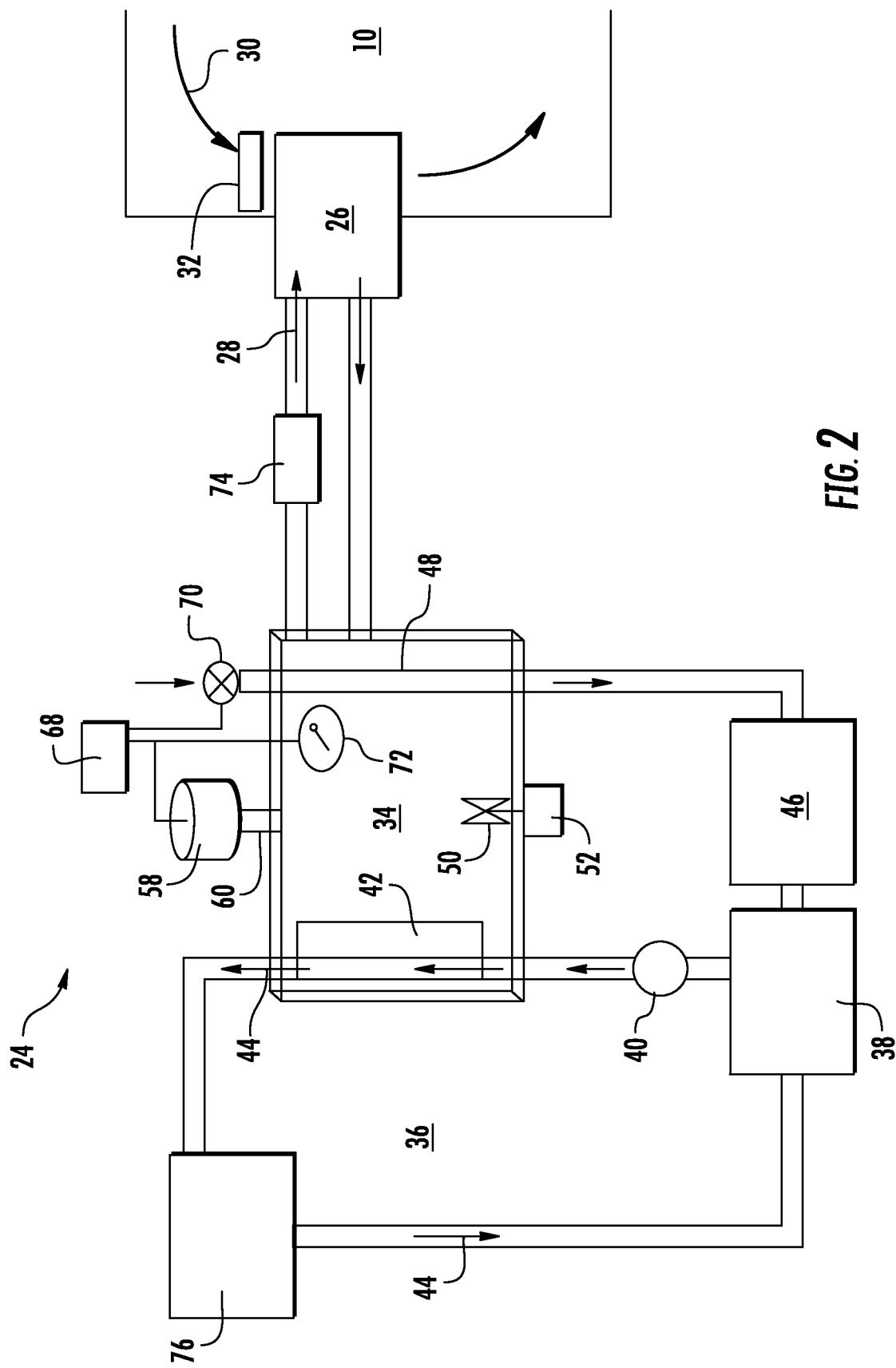
FIG. 2 is an illustration of an embodiment of a refrigeration system for a refrigerated transportation cargo container.

Referring to FIG. 2, the refrigeration unit 24 includes a cargo heat exchanger 26 located at least partially inside the cargo container 10. The cargo heat exchanger 26 has a volume of heat transfer fluid 28, for example, a fluid coolant such as glycol or other fluid such as abrine, circulating therethrough. It is to be appreciated, however, that other heat exchange mediums, including gasses or phase-change mediums may be utilized and circulated through the cargo heat exchanger 26. In some embodiments, the heat transfer fluid 28 is urged through the cargo heat exchanger 26 via a pump 74. Airflow 30 from the cargo compartment is circulated across the cargo heat exchanger 26 by, for example, fan 32 and the airflow 30 is cooled or heated via thermal energy exchange with the heat transfer fluid 28 at the cargo heat exchanger 26. Thus, the airflow 30 is utilized to maintain the interior of the cargo compartment 10 at a selected temperature.

For the airflow 30 to be maintained at the selected temperature, the heat transfer fluid 28 is cooled and/or heated at a regeneration heat exchanger 34. The regeneration heat exchanger 34 is a closed volume filled with heat transfer fluid 28 and is fluidly connected to a refrigerant circuit 36. The refrigerant circuit 36 includes at least a compressor 38, an expansion device 40, a refrigerant heat exchanger 42, and an ambient heat exchanger 76 fluidly connected in series with a flow of refrigerant 44 circulating therethrough. The compressor 38 is operably connected to an engine 46 which drives the compressor 38. The engine 46 is connected to the compressor 38 in one of several ways, such as a direct shaft drive, a belt drive, one or more clutches, or via an electrical generator. While the engine 46 in the embodiment of FIG. 2 is utilized to power a refrigerant circuit, one skilled in the art will readily appreciate that the engine 46 may serve other purposes, for example, the engine 46 may be the prime mover of a truck or other vehicle to which the cargo container 10 is affixed.

The engine 46 is powered by a fuel, in some embodiments, compressed natural gas (CNG), liquid natural gas (LNG) or propane. In order to be usable by the engine 46, the fuel must be regenerated, or brought to or near to ambient temperature and pressure. Thus, before being injected into the engine 46, the fuel is conveyed through the regeneration heat exchanger 34 via fuel line 48. FIG. 2 illustrates an embodiment of an LNG-driven system. Before use, the LNG fuel must be heated from −273 degrees F. to ambient to gasify the LNG fuel.

The heat transfer fluid 28 circulating back to the regeneration heat exchanger 34 has a higher temperature, relative to the LNG fuel flowing through the fuel line 48, thus in thermal energy exchange between the two, the heat transfer fluid 28 is cooled, and the LNG fuel is heated, typically heated sufficiently to gasify the fuel. The gasified fuel is then fed to the engine 46 via the fuel line 48 to drive the compressor 38 of the refrigerant circuit 36. The refrigerant circuit 36 then operates to supply the flow of refrigerant 44 to the refrigerant heat exchanger 42 providing further cooling to the heat transfer fluid 28 in the regeneration heat exchanger 34. The cooled heat transfer fluid 28 is then circulated to the cargo heat exchanger 26. It is to be appreciated that, under some conditions, operation of the refrigerant circuit 36 to provide additional cooling to the heat transfer fluid 28 at the regeneration heat exchanger 34 may not be necessary and that the heat transfer fluid 28 is cooled sufficiently by the LNG fuel in the fuel line 48. Further, the refrigerant circuit 36 is switchable such that flow may be reversed in order to increase the temperature of the heat transfer fluid 28 if it falls below the selected temperature, or to provide heating to the cargo container 10 via the heat transfer fluid 28.

In some embodiments, the heat transfer fluid 28 is agitated or stirred in the regeneration heat exchanger 34 to increase uniformity of a temperature of the heat transfer fluid 28. To accomplish this, an impeller 50 is located in the regeneration heat exchanger 34 and driven by an impeller motor 52.

Figure 3:
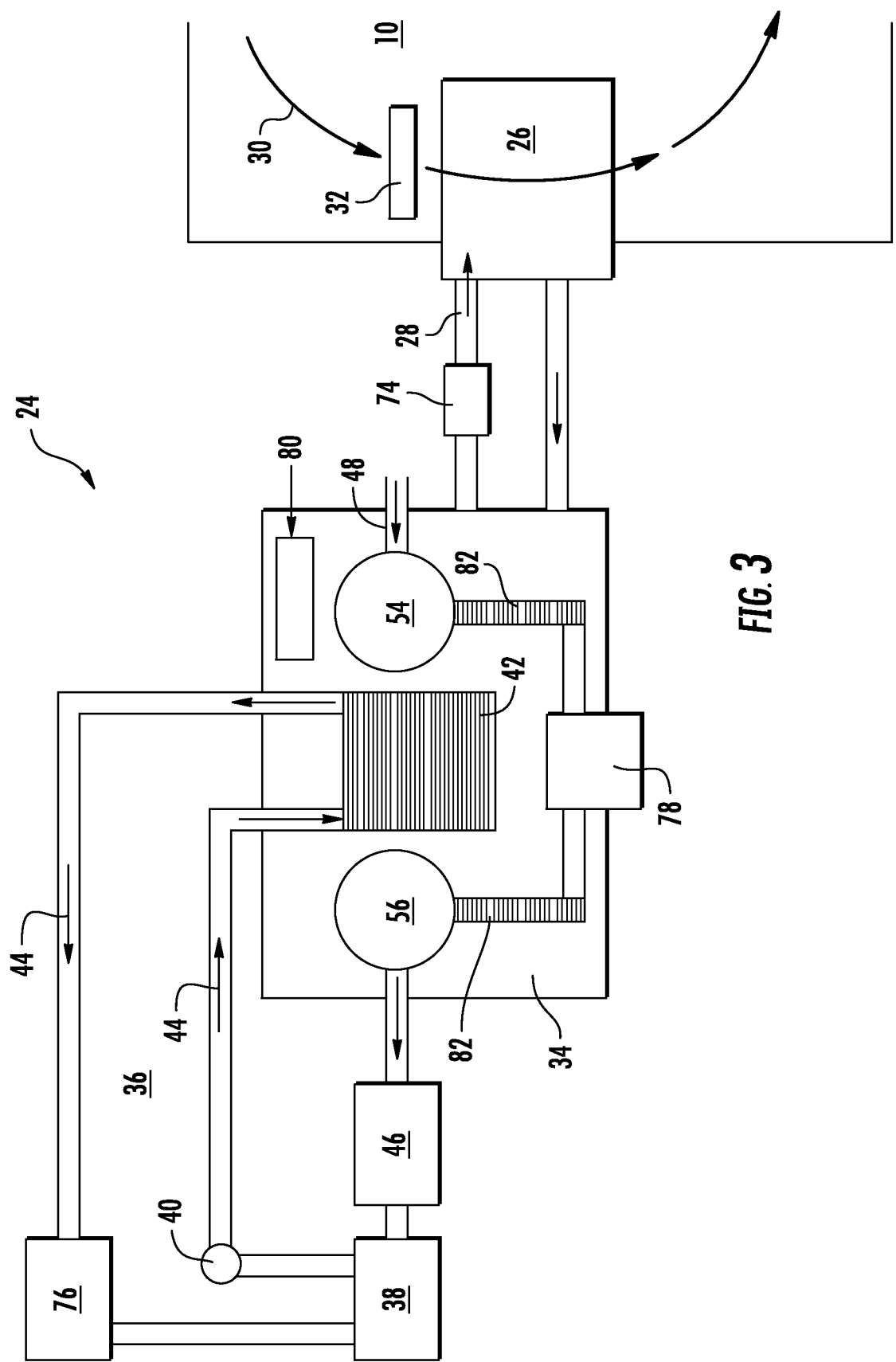
FIG. 3 is an illustration of another embodiment of a refrigeration system for a refrigerated transportation cargo container.

Referring to FIG. 3, in another embodiment, compressed natural gas (CNG) is utilized as the fuel source for the engine 46 and the CNG is decompressed via a high pressure regulator (HPR) 54 and a dual stage regulator (DSR) 56 from its storage pressure of about 3600 PSI to about 10 PSI or less. The HPR 54 and the DSR 56 are located in the regeneration heat exchanger 34. The heat transfer fluid 28 imparts thermal energy to the CNG, the HPR 54 and DSR 56 to prevent the regulators from falling below operable temperatures. The flow of CNG then is flowed out of the regeneration heat exchanger 28 to the engine 46. As in the embodiment of FIG. 2, the cooled heat transfer fluid 28 is then circulated to the cargo heat exchanger 26. In some embodiments, the fuel flows through a filter 78 located in the regeneration heat exchanger 34. The filter 78 may be located along the fuel line 48 between the HPR 54 and DSR 56. Further, in some embodiments, a heater 80, such as an electric heater, may be located in the regeneration heat exchanger 34 to improve operational flexibility of the regeneration heat exchanger 34 in maintaining the heat transfer fluid 28 at the selected temperature. In some embodiments, one or more fuel line heat exchangers 82 are positioned along the fuel line 48 in the regeneration heat exchanger 34. For example, fuel line heat exchangers 82 may be located upstream and/or downstream of filter 78 as shown in FIG. 3. Fuel line heat exchangers 82 aid in thermal energy exchange between the heat transfer fluid 28 in the regeneration heat exchanger 34 and the flow of fuel in the fuel line 48.

Referring again to FIG. 2, leakage of fuel from the fuel line 48 into the heat transfer fluid 28 at the regeneration heat exchanger 34 can potentially contaminate the heat exchange fluid 28, and therefore possibly cause fuel to be introduced into the cargo or passenger compartment. To prevent such hazards and to detect leakage of fuel into the regeneration heat exchanger 34, the regeneration heat exchanger 34 includes a fuel separator 58 located at or near a top extent of the regeneration heat exchanger 34. Any fuel leaking from the fuel line 48 is gasified by the heat exchange medium 28 and rises into the fuel separator 58 through a separator inlet 60, along with expanding heat transfer fluid 28.

Figure 4:
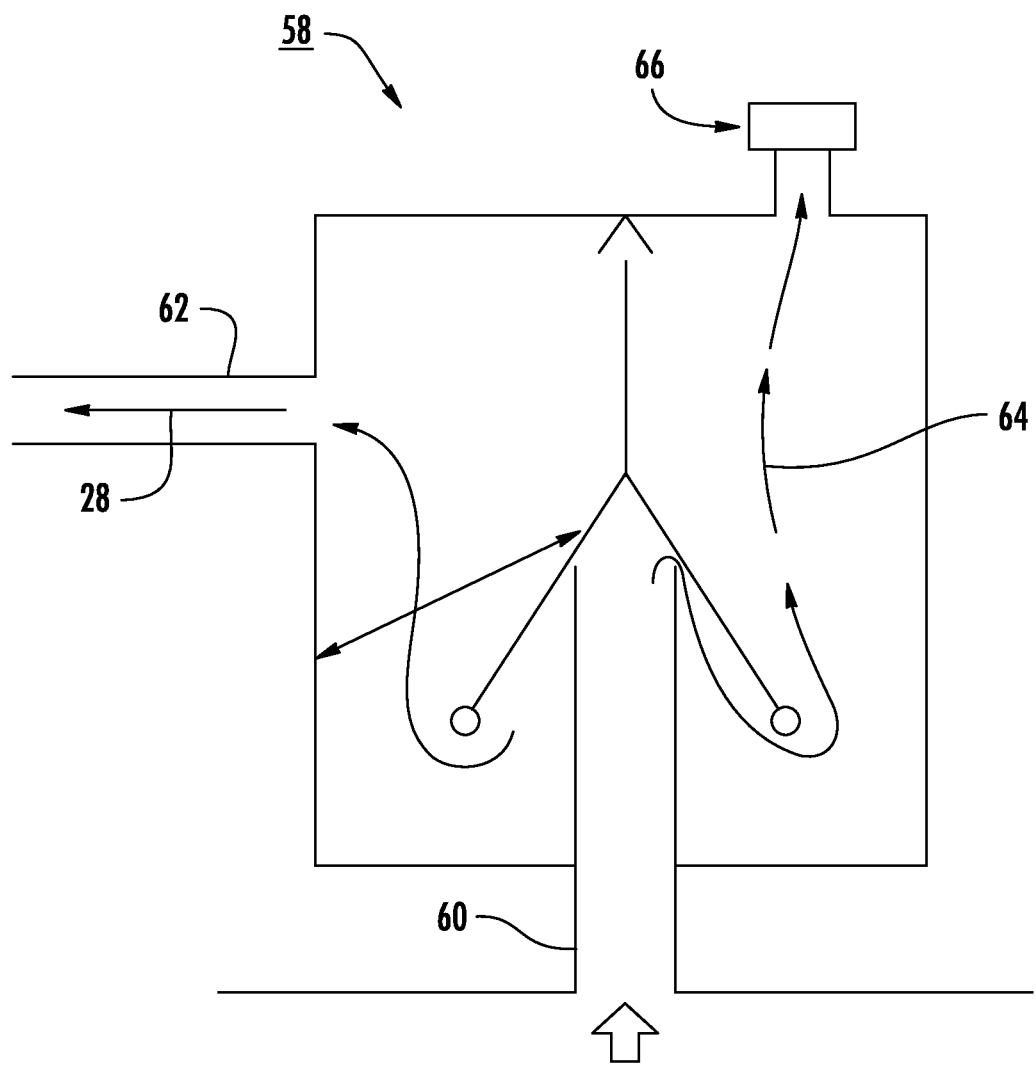
FIG. 4 is a cross-sectional view of an embodiment of a fuel separator for a refrigeration system for a transportation cargo container.

Referring now to FIG. 4, excess heat transfer fluid 28 flows out of the fuel separator 58 into an overflow line 62, while gasified fuel 64 flows into one or more sensors, such as methane detector 66. When the methane detector 66 detects gasified fuel 64, a signal is sent from the methane detector to a controller 68, shown in FIG. 2, which in turn signals a fuel control valve 70 to close and stop the flow of fuel through the fuel line 48 thus shutting the engine 46 off and preventing further leakage of fuel. Further, the regeneration heat exchanger 34 includes a pressure and/or temperature transducer 72 which detects temperature and/or pressure of the heat transfer fluid 28 in the regeneration heat exchanger 34. The temperature and/or pressure are compared to thresholds either at the transducer 72 or another location, for example, the controller 68. If an overpressure or over temperature or under temperature condition is detected by the transducer 72 from, for example, a clogged fuel separator 58, the controller 68 signals for closure of the fuel control valve 70 to stop the flow of fuel through the fuel line 48. The closure of the fuel control valve 70 stops the flow of fuel thereby stopping leakage of the fuel into the heat transfer fluid 28. This in turn stops fuel supply to the engine 46 stopping engine 46 operation.

Use of the heat transfer fluid 28 as the main thermal exchange fluid at the cargo heat exchanger 26 provides several benefits to the refrigeration unit 24 and the cargo container 10. It greatly reduces the amount of refrigerant 44 required to cool the cargo container 10, as the size of the refrigerant circuit 36 containing refrigerant 44 is reduced. Also, the risk of cargo 22 contamination by a refrigerant leak is greatly reduced, since the flow of refrigerant 44 is kept isolated from the cargo. Further, the capacity of the refrigeration system is increased by taking advantage of the cooling provided by regeneration of the fuel to ambient conditions to cool the heat transfer fluid, and by using waste energy from the heated heat transfer fluid 28 to perform the regeneration of the fuel at the regeneration heat exchanger 34.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A refrigeration system for a selected space, comprising:
   a regeneration heat exchanger containing a volume of heat transfer fluid;
   a cargo heat exchanger disposed at the selected space, the cargo heat exchanger fluidly connected to the regeneration heat exchanger to circulate the volume of heat transfer fluid therethrough, the selected space conditioned to a selected cargo temperature via thermal energy exchange between the heat transfer fluid and a flow of air at the selected space;
   a fuel line extending through the regeneration heat exchanger and toward an engine, the fuel line directing a flow of fuel to the engine to power the engine, the flow of fuel regenerated via thermal energy exchange with the heat transfer fluid at the regeneration heat exchanger, the heat transfer fluid reaching a selected heat transfer fluid temperature via thermal exchange with the flow of fuel; and
   a refrigerant circuit including:
      a refrigerant heat exchanger disposed in the regeneration heat exchanger; and
      a compressor fluidly connected to the refrigerant heat exchanger to circulate a flow of refrigerant through the refrigerant heat exchanger, the engine coupled to the compressor to drive the compressor, the heat transfer fluid reaching the selected heat transfer fluid temperature via thermal exchange with the flow of fuel and with the flow of refrigerant;

wherein the flow of refrigerant is separate and distinct from the volume of heat transfer fluid.

2. The refrigeration system of claim 1, wherein the refrigerant circuit is configured to be switchable into a reversed operation to increase a temperature of the heat transfer fluid.

3. The refrigeration system of claim 1, wherein the flow of fuel is one of liquefied natural gas or compressed natural gas.

4. The refrigeration system of claim 1, wherein the heat transfer fluid is glycol.

5. The refrigeration system of claim 1 further comprising one or more regulators disposed at the fuel line in the regeneration heat exchanger.

6. The refrigeration system of claim 5, wherein thermal energy exchange between the heat transfer fluid and the one or more regulators at the regeneration heat exchanger prevents the temperature of the one or more regulators from falling below an operable regulator temperature.

7. The refrigeration system of claim 1, further comprising one or more sensors at the regeneration heat exchanger to detect presence of the flow of fuel in the heat transfer fluid.

8. The refrigeration system of claim 7, further comprising a fuel separator operably connected to the regeneration heat exchanger to separate the flow of fuel from the heat transfer fluid.

9. The refrigeration system of claim 1, further comprising a fuel line heat exchanger disposed along the fuel line at the regeneration heat exchanger to aid in the thermal energy exchange between the flow of fuel and the heat transfer fluid.

10. The refrigeration system of claim 1, wherein the selected space is a refrigerated cargo container.

11. A method of maintaining a selected space at a selected temperature comprising:

directing a flow of fuel through a regeneration heat exchanger and toward an engine, the regeneration heat exchanger containing a volume of heat transfer fluid;

regenerating the flow of fuel via thermal energy exchange with the heat transfer fluid, the heat transfer fluid conditioned to a selected fluid temperature;

directing at least a portion of the heat transfer fluid to a cargo heat exchanger disposed at the selected space;

exchanging thermal energy between the heat transfer fluid and a flow of supply air at the cargo heat exchanger to condition the supply air to a selected air temperature;

conveying the heat transfer fluid to the regeneration heat exchanger;

powering a compressor of a refrigerant circuit via the engine;

flowing a flow of refrigerant through the compressor to a refrigerant heat exchanger disposed at the regeneration heat exchanger; and transferring thermal energy between the flow of refrigerant and the heat transfer fluid at the regeneration heat exchanger, conditioning the heat transfer fluid to the selected fluid temperature via the thermal energy exchange with the flow of refrigerant and the flow of fuel;

wherein the flow of refrigerant is separate and distinct from the volume of heat transfer fluid.

12. The method of claim 11, wherein operation of the refrigerant circuit is reversed to increase a temperature of the heat transfer fluid.

13. The method of claim 11, wherein the flow of fuel is one of liquefied natural gas or compressed natural gas.

14. The method of claim 11 further comprising flowing the flow of fuel through one or more regulators disposed at the fuel line in the regeneration heat exchanger.

15. The method of claim 14, further comprising exchanging thermal energy between the heat transfer fluid and the one or more regulators at the regeneration heat exchanger to prevent the temperature of the one or more regulators from falling below an operable regulator temperature.

16. The method of claim 11, further comprising directing the flow of fuel through a fuel line heat exchanger disposed along the fuel line at the regeneration heat exchanger to aid in the thermal energy exchange between the flow of fuel and the heat transfer fluid.

17. The method of claim 11, wherein the selected space is a refrigerated cargo container.

\* \* \* \* \*